Patented May 18, 1926.

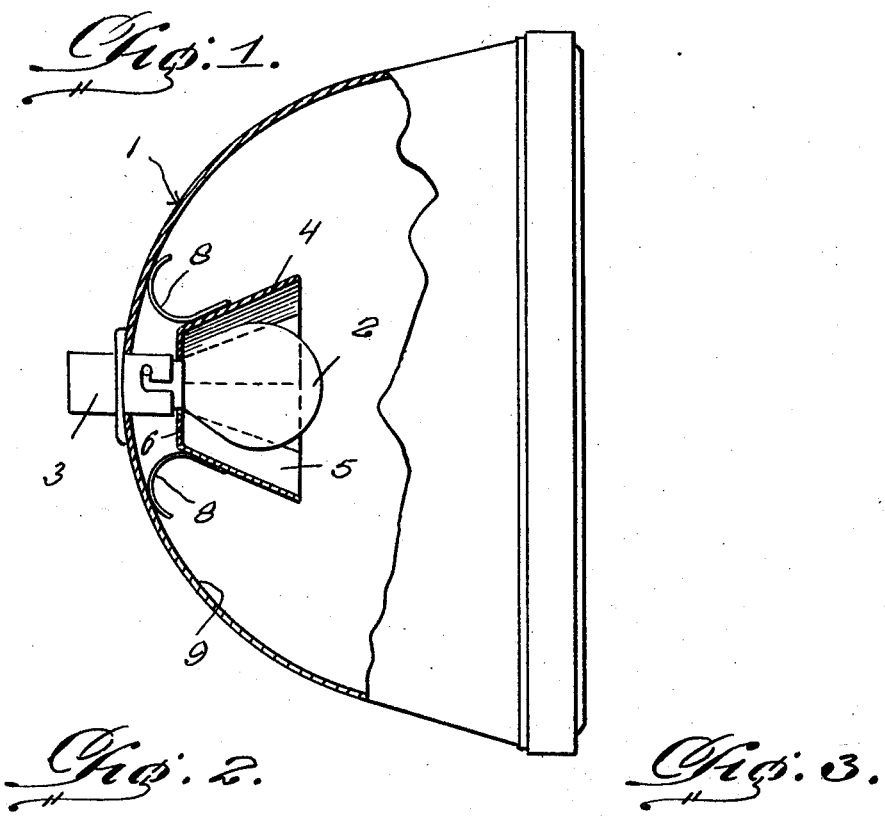

1,585,465

UNITED STATES PATENT OFFICE.

JOHN B. COAKER, WILLIAM A. BALDWIN, AND ALEXANDER M. SMITH, OF RICHMOND, VIRGINIA.

GLARE PREVENTER FOR AUTOMOBILE HEADLIGHTS.

Application filed June 17, 1925. Serial No. 37,746.

This invention relates to automobile headlights and is more particularly adapted to a highly novel device for preventing the glare yet permitting the light to properly illuminate the road.

One of the important objects of the present invention is to provide a glare preventor of the above mentioned character which is of such construction as to enable the same to be readily and easily attached to automobile headlights now generally in use.

A further object is to provide a glare preventer of the above mentioned character which includes a means for properly supporting the same around the lamp or bulb in the headlight.

A still further object is to provide a glare preventer which is simple in construction, inexpensive, and furthermore adapted to the purposes for which the same is designated.

Other objects and advantages of this invention will become apparent during the course of the following description.

In the accompanying drawing forming part of this specification and in which like numerals are employed to designate like parts throughout the same:

Figure 1 is a side elevation of an automobile headlight partly broken away showing the glare preventer embodying my invention associated therewith.

Figure 2 is a rear elevation of the glare preventer, and

Figure 3 is a front elevation thereof.

In the drawing wherein for the purpose of illustration is shown the preferred embodiment of our invention, the numeral 1 designates the usual casing of an automobile headlight of the conventional construction, the electric bulb or lamp being indicated at 2 and the socket provided therefor is illustrated at 3. The lamp is adapted to be detachably supported in the socket in the manner well known in the art.

The glare preventer comprises the substantially frusto-pyramidal shaped member 4 which is formed of any suitable metallic material, the same being further substantially of octagonal design in end elevation as is clearly illustrated in Figs. 2 and 3. It is of course to be understod however, that we do not wish to limit ourselves to the particular shape of the glare preventer.

The inner faces of the sides of the glare preventer provide a reflector surface 5. The smaller rear end 6 of the glare preventer is provided with the opening 7 through which is adapted to be disposed the base of the bulb 2 so that when the bulb is supported in its socket 3, the glare preventer will extend around the bulb or lamp 2 and be slightly spaced therefrom in the manner as more clearly illustrated in Fig. 1.

For the purpose of properly supporting the glare preventer in spaced relation with respect to the lamp or bulb 2, we have provided the curved spring fingers 8. These fingers have their forward ends secured to the outer faces of certain of the opposed sides of the frusto-pyramidal member 4 and in the present instance, four of such spring fingers are illustrated. The rear free ends of these fingers are adapted to engage the reflecting surface 9 of the headlight casing 1 in the manner as clearly illustrated in Fig. 1. The spring fingers will thus resiliently support the glare preventer and thus keep the frusto-pyramidal member 4 spaced from the lamp so as to prevent any possibility of the lamp becoming broken.

When the preventer member 4 is installed, the rays of light from the lamp will strike the reflecting surfaces of the glare preventer and will then be directed forwardly and outwardly of the headlight in such a manner as to prevent the glare from blinding the driver of an approaching vehicle, yet properly illuminating the road.

A device of the above mentioned character will at all times be positive and efficient in carrying out the purposes for which the same is designed and the simplicity of the device enables the same to be manufactured at a very low cost, and will yet be strong and durable.

While we have shown the preferred embodiment of our invention, it is to be understood that various changes in the size, shape and arrangement of parts may be resorted to without departing from the spirit or sacrificing any of the advantages of the appended claim.

What we claim is:—

A device for preventing the glare from headlights comprising a substantially frusto-pyramidal shaped member, the smaller rear end thereof being provided with an opening for accommodating the base of the lamp in the headlight, said frusto-pyramidal shaped member extending around the lamp, the inner surfaces of the sides of said member providing a reflector surface, and a plurality of curved spring fingers secured at their forward ends on the outer faces of the opposed sides of the frusto-pyramidal shaped member, the rear free ends of said spring fingers having curved portions adapted to engage the inner surface of the headlight casing for resiliently supporting the aforementioned member in spaced relation with respect to the lamp.

In testimony whereof we affix our signatures.

JOHN B. COAKER.
WILLIAM A. BALDWIN.
ALEXANDER M. SMITH.